United States Patent [19]

Hrabal et al.

[11] 4,231,394
[45] Nov. 4, 1980

[54] CLOSING MEMBER FOR A RING VALVE

[75] Inventors: Hans Hrabal; Josef Wimmer, both of Vienna, Austria

[73] Assignee: Enfo Grundlagen Forschungs AG, Döttingen, Switzerland

[21] Appl. No.: 43,654

[22] Filed: May 30, 1979

Related U.S. Application Data

[63] Continuation of Ser. No. 825,781, Aug. 18, 1977, abandoned.

[30] Foreign Application Priority Data

Jul. 1, 1977 [AT] Austria .............................. 46901/77

[51] Int. Cl.³ ............................................ F16K 15/14
[52] U.S. Cl. ............................ 137/512; 137/512.15; 137/516.13
[58] Field of Search ..................... 137/516.11, 516.13, 137/516.15, 516.17, 516.19, 516.21, 516.23, 512, 512.15, 512.4; 417/560, 567, 571

[56] References Cited

U.S. PATENT DOCUMENTS

| | | | |
|---|---|---|---|
| 724,641 | 4/1903 | Wiki | 137/512.15 |
| 1,299,761 | 4/1919 | Nelson | 137/516.11 X |
| 2,798,505 | 7/1957 | Kehler | 137/516.11 |
| 3,123,095 | 3/1964 | Kohler | 137/516.23 |
| 3,566,914 | 3/1971 | Koehler | 137/516.13 |

FOREIGN PATENT DOCUMENTS 33311 10/1906 Austria .
1259158 1/1968 Fed. Rep. of Germany .
2648682 5/1977 Fed. Rep. of Germany .

*Primary Examiner*—William R. Cline
*Attorney, Agent, or Firm*—Watson, Cole, Grindle & Watson

[57] ABSTRACT

A closing member for a ring valve is a flexible reed of substantially semicircular form comprising an outer ring portion with mounting points at its ends, and a plurality of inner ring portions connected to the outer ring portion by at least one radial web.

8 Claims, 5 Drawing Figures

CLOSING MEMBER FOR A RING VALVE

This is a continuation of application Ser. No. 825,781 filed Aug. 18, 1977, now abandoned.

The invention relates to a valve closing member for a valve with a plurality of concentrically arranged portways, more particularly the suction or delivery valve of a piston compressor, in which the said plate is mounted at two places on a valve seat and comprises a plurality of flexible ring portions which control the portways and are joined by radial webs.

The operating valves of piston compressors, more particularly large piston compressors, are usually constructed as ring plate valves with concentrically arranged portways. This kind of ring valve can be produced more simply than valves with rectilinear portways, it adapts more readily to the circular circumference of the compressor cylinders and permits optimum utilization of the available valve surface for the flow of the controlled medium. So-called reed valves on the other hand are of simpler construction since they do not normally require separate springs or measures for shock damping. Furthermore, they operate smoothly and are correspondingly subjected to lower stresses. However, the valve cross-section opened by such valves is less than that of plate valves because the reeds are clamped at one end and thus only open a wedge-shaped lifting gap.

For a long time attempts have been made to combine the advantages of ring plate valves with those of reed valves. For example, Austrian Patent Specification No. 33 311 discloses means by which ring valve plates, consisting of one or more concentric rings, are separated by a plurality of radial slots and the separated rings are mounted on one or at most two places on the valve seat. This results in relatively long, spirally extending flexible reeds with free ends the movements of which cannot be readily controlled and which do not meet the more stringent requirements of the present day.

German Patent Specification No. 1 259 158 discloses means by which a valve closing plate, consisting of closed concentric rings, is clamped in the manner of a reed. To obtain the necessary flexibility, the connecting webs are provided on only one single plate diameter. The plate is clamped by means of a cylindrically curved retainer either along the web diameter or along the edge of the valve seat so that it is able to lift freely on its edge which is distal from the clamping place. The shape of the plate and of the valve seat correspond to those of the ring plate valves. However, when the valve is open the concentric rings reveal only conically extending lift gaps so that the flow cross-section is correspondingly small.

Another known valve is described in the German Offenlegungsschrift No. 2 648 682. A closing plate, comprising concentric rings, is provided in which some of the plate rings are separated by radial slits and one or more full rings are used for securing the plate on the valve seat. As in the other known valve plates, this plate is a seal, circular plate which cooperates with a mating circular valve seat. It is however also known to arrange the suction valve and delivery valve of a compressor on the same circular valve seat in adjacent configuration. To this end, the valve plate is clamped along one diameter in sealed manner, one plate half bearing on the suction valve seat and the other plate half bearing on the delivery valve seat, but with the other plate side. This arrangement calls for a relatively complicated construction of the seat and retainer parts of the combined valve. Clamping and sealing of the valve plate, which acts both as suction valve and delivery valve, give rise to difficulties.

It is the object of the invention to construct a valve closing member so that it is able to control concentric portways in annular configuration like the valve plate of a multi-ring valve, but nevertheless enables the valve components to be shaped in an unrestricted and simple manner while completely retaining the advantages of reed valves.

The present invention resides in a closing reed for a valve with a plurality of concentrically arranged portways, which reed is provided with two mounting mounts for mounting on a valve seat and comprises a plurality of flexible ring portions for controlling the portways which portions are joined by radial webs, which reed extends over an angle of less than 360° and has a first ring portion which is continuous between the two mounting points and to which the remaining ring portions are attached by means of at least one radial web.

The angular extent is preferably approximately 180°. Thus the valve reed according to the invention is provided with ring portions but not with complete rings and it covers only part of a circular valve seat. The designer is therefore substantially less restricted as regards the construction of the remaining parts of the valve. More particularly, in a valve set comprising a suction valve and delivery valve, both valves can be arranged at any desired distance and in any desired spatial configuration with respect to each other, including adjacently in different planes. This offers the advantage of permitting the use of flat plates as seat and retainer in a combined valve set and no seal is required between the suction chamber and the delivery chamber in the region of the valve reed.

Another feature of the valve reed according to the invention is its advantageous method of operation. Being clamped at both ends, it is necessarily accurately guided but without friction, so that uncontrolled tumbling motions are avoided. The annular portion, usually of semicircular shape, extending between the two mounting points can also act in the manner of a closing spring by applying only a slight spring force near the valve seat but undergoing torsion at a greater distance from the valve seat under the action of the remaining ring portions so that the spring force increases substantially immediately before the retainer is struck. The valve reed according to the invention therefore operates smoothly and with damping. A valve provided with such a reed actually combines the advantages of ring plate valves with those of known reed valves without having the disadvantages of either of these kinds of valves.

The properties of the valve reed according to the invention, more particularly its flexibility, can be adapted to the prevailing requirements. With the exception of the continuous ring portion between the two mounting points, the remaining ring portions can be connected to each other by only a single radial web and can terminate freely so that they are able to flex independently of each other. However, an embodiment, in which at least some of the ring portions are inter-connected by additional webs, more particularly at their ends, has proved itself for higher stresses. The properties of the valve reed can thus be influenced at will by the appropriate choice of the number and arrangement of the connecting webs.

To secure the valve reed according to the invention, it has been found advantageous to allow the continuous ring portion between the mounting places to project in the circumferential direction beyond the remaining ring portions. This produces small extension in which apertures are conveniently provided for engagement either with centring pins or with mounting screws.

Embodiments of the invention will now be explained with reference to the accompanying drawings in which.

Figure 1:
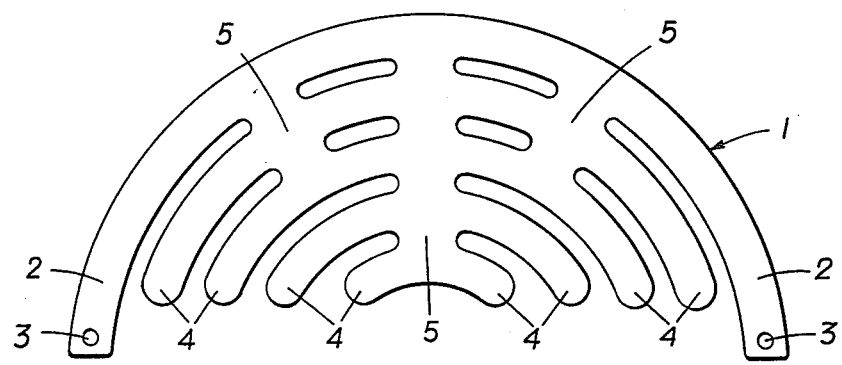
FIGS. 1 to 3 show respective embodiments of the valve reed according to the invention in plan view.

In the drawings, the valve reed is referenced with the numeral 1. In all the illustrated embodiments, it is approximately semicircular and comprises concentrically arranged ring portions of which the outermost ring portion 2 is continuous between two mounting points 3 which are indicated by apertures in the ends of the ring portion 2. The remaining ring portions 4 are attached to ring portion 2 by means of radial webs 5.

In FIG. 1, the ring portions 4 are connected to the ring portion 2 by a total of three radial webs, of which one web is situated half way between the two mounting points 3 and is continuous through all the ring portions 4 and the two remaining webs 5 interconnect only the three outer ring portions. The ring portions 4 have reed-shaped free ends which can move independently of each other to a specific degree. The valve reed according to FIG. 1 is therefore characterized by a high degree of internal elasticity.

Figure 2:
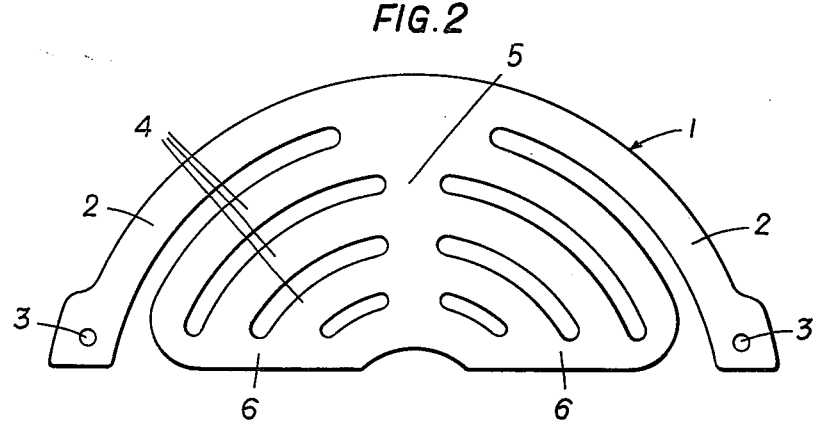

In the embodiment according to FIG. 2, only a single web 5 is provided between the ring portion 2 and the remaining ring portions 4, and said web is broadened near the ring portion 2. The ends of the remaining ring portions 4 are connected to each other by additional webs 6. The strength of the valve reed is thus increased but the inner ring portions 4 remain relatively elastic relative to the clamped ring portion 2.

Figure 3:
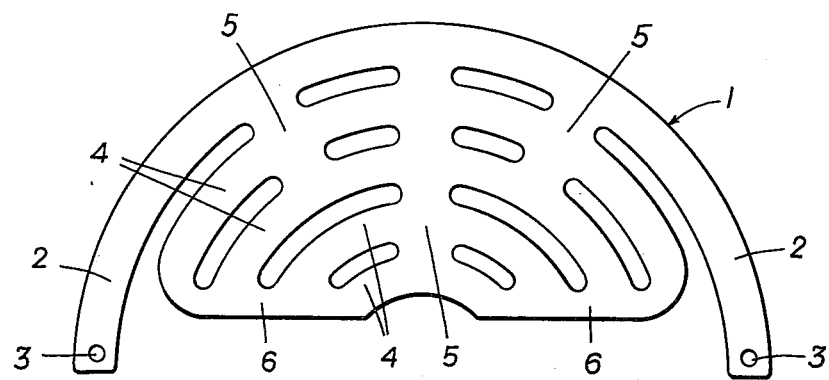

FIG. 3 shows a modification in which three connecting webs 5 are provided and the ends of the ring portion 4 are additionally connected to each other by means of webs 6.

In the embodiments illustrated in FIGS. 1 and 3, the ends of the ring portions 2 project in the circumferential direction beyond the remaining ring portions 4 so that the mounting points 3 are readily accessible for anchoring the valve reed 1. In FIG. 2, the ends of the ring portion 2 are however merely broadened. The valve reeds can be secured in the valve in different ways. In the region of the mounting points 3 the ring portion 2 can be either fixedly clamped between the valve seat and the retainer, where appropriate with the inter-position of a spacer. It is however also possible to provide screw fasteners at the mounting points to stress the ends of the ring portion 2 against the associated valve seat.

Figure 4:
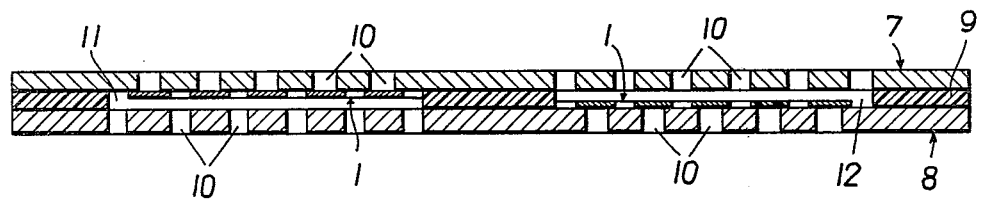
FIG. 4 is a medial section, along the line IV—IV of FIG. 5, of a compressor valve provided with two valve reeds according to the invention.
Figure 5:
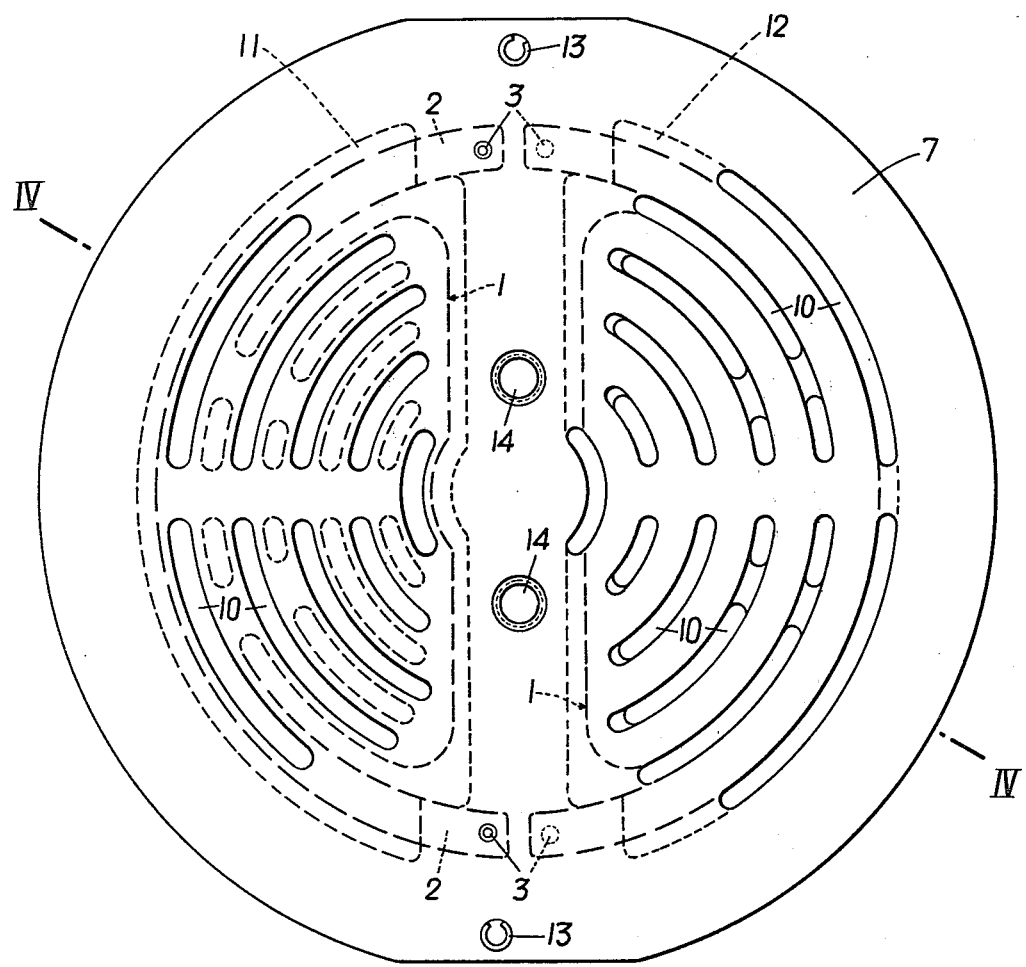
FIG. 5 is a plan view of the valve according to FIG. 4.

The valve seat according to FIGS. 4 and 5 is a combined valve set, of which the left half is a suction valve and the right half is a delivery valve. Two disc-shaped valve members 7 and 8 are provided and are arranged one above the other with the interposition of a spacer disc 9. Advantageously, the two valve members 7 and 8 are identically constructed and comprise plane discs which are provided with portways 10. Conveniently, the spacer disc 9 consists of resilient material such as sealing material and in each of the two halves of the disc-shaped valve member it is provided with a recess 11, 12 in each of which there is provided a valve reed 1. The portways 10 are of cardioid configuration and are situated on concentric circles, as is common practice for ring valves.

Each of the valve reeds 1 is clamped between the spacer disc 1 and one of the valve members 7 or 8. This is revealed in FIG. 5, the left half of which shows the suction reed 1 in broken lines. The mounting points 3 are situated in the region of the spacer disc 9 and are formed by centring pins. It would also be possible for each of the free ends of the outer ring portion 2 to be secured in the recesses 11 or 12 on the associated valve member 7, 8 by means of a screw fastener. In both cases the valve reeds 1 of the suction valve and of the delivery valve can be arranged at any desired distance from each other. The portways need not therefore be necessarily situated on concentric circles. They can also be moved for example in FIG. 5 to the left and right away from each other towards the outside, so as to produce an oval configuration.

The numerals 13 in FIG. 5 refer to resilient pins which extend through bores of the valve members 7, 8 and of the spacer disc 9 and thus retain the valve parts together before they are installed into a valve. Tapped holes 14 are also provided by means of which the relatively large valve can be tightened in the central region against the intermediate wall of the cylinder head (not shown) so that no leakages can occur at that place.

We claim:

1. A closing reed for mounting on a valve seat having a plurality of concentrically arranged portways, comprising:

a plurality of flexible ring members extending in radial spaced concentric relationship over an angle less than 360° for controlling the flow of fluid through the valve portways and being separated by concentrically extending slits between adjoining ring members;

the outermost one of said flexible ring members including two substantially diametrically positioned mounting holes and being continuous therebetween;

at least one radially extending web member interconnecting said plurality of concentric ring members and said outermost flexible ring member; and additional radially extending web members interconnecting at least some of said plurality of concentric ring members and said outermost ring member, said additional web members being respectively located at intermediate positions on the circumference of said outermost ring member between said mounting holes.

2. A closing reed for mounting on a valve seat having a plurality of concentrically arranged portways, comprising:

a plurality of flexible ring members extending in radial spaced concentric relationship over an angle less than 360° for controlling the flow of fluid through the valve portways and being separated by concentrically extending slits between adjoining ring members;

the outermost one of said flexible ring members including two substantially diametrically positioned mounting holes and being continuous therebetween;

at least one radially extending web member interconnecting said plurality of concentric ring members and said outermost flexible ring member; and additional web members interconnecting said plurality of flexible ring members at the respective end portions thereof remote from said at least one radially extending web member.

3. A closing reed as in claims 1 or 2 wherein said outermost flexible ring member extends in the circumferential direction beyond the plurality of flexible ring members.

4. A closing reed as in claims 1 or 2 wherein the outermost ring member extends over an angle of substantially 180°.

5. A combined valve assembly for compressors including suction and delivery valve sections having two disc-shaped valve members provided with concentrically arranged portways for the flow of fluid therethrough and located in spaced relation one above the other, a spacer disc consisting of resilient material such as sealing material and provided with two recesses; a valve reed being arranged within each of the recesses and comprising:

a first flexible ring portion extending over an angle less than 360° and being fastened by end portions thereof between the spacer disc and one of the two disc-shaped valve members;

a plurality of flexible ring portions extending in radial spaced concentric relationship to the first flexible ring portion and being interconnected by at least one radially extending web member starting from the flexible part of the first flexible ring portion extending between the two fastened end portions thereof;

additional radially extending web members interconnecting at least some of said plurality of concentric ring members and said outermost ring member, said additional web members being respectively located at intermediate positions on the circumference of said outermost ring member between said mounting holes; and the valve reed positioned in the first recess controlling the flow of fluid through the portways of the suction valve, and the valve reed positioned in the second recess controlling the flow of fluid through the portways of the delivery valve.

6. A combined valve assembly for compressors including suction and delivery valve sections having two disc-shaped valve members provided with concentrically arranged portways for the flow of fluid therethrough and located in spaced relation one above the other, a spacer disc consisting of resilient material such as sealing material and provided with two recesses; a valve reed being arranged within each of the recesses and comprising:

a first flexible ring portion extending over an angle less than 360° and being fastened by end portions thereof between the spacer disc and one of the two disc-shaped valve members;

a plurality of flexible ring portions extending in radial spaced concentric relationship to the first flexible ring portion and being interconnected by at least one radially extending web member starting from the flexible part of the first flexible ring portion extending between the two fastened end portions thereof;

additional web members interconnecting said plurality of flexible ring members at the respective end portions thereof remote from said at least one radially extending web member; and the valve reed positioned in the first recess controlling the flow of fluid through the portways of the suction valve, and the valve reed positioned in the second recess controlling the flow of fluid through the portways of the delivery valve.

7. The combined valve assembly of claim 5 or 6 wherein said outermost flexible ring member extends in the circumferential direction beyond the plurality of flexible ring members.

8. The combined valve assembly as in claim 5 or 6 wherein the outermost ring member extends over an angle of substantially 180°.

* * * * *